United States Patent
Katougi

(10) Patent No.: US 6,667,453 B1
(45) Date of Patent: Dec. 23, 2003

(54) ELECTRIC DISCHARGE MACHINING METHOD AND APPARATUS WITH CONTROL OF ROCKING FUNCTION PARAMETERS

(75) Inventor: Hidetaka Katougi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/913,824

(22) PCT Filed: Dec. 20, 1999

(86) PCT No.: PCT/JP99/07135

§ 371 (c)(1),
(2), (4) Date: Aug. 20, 2001

(87) PCT Pub. No.: WO01/45889

PCT Pub. Date: Jun. 28, 2001

(51) Int. Cl.[7] ............ B23H 7/18; B23H 7/16; B23H 7/28

(52) U.S. Cl. ............ 219/69.16; 219/69.19; 219/69.2

(58) Field of Search .......... 219/69.16, 69.17, 219/69.2, 69.19

(56) References Cited

U.S. PATENT DOCUMENTS

| | | | | |
|---|---|---|---|---|
| 3,705,286 A | * | 12/1972 | Kondo | 219/69.16 |
| 4,453,071 A | * | 6/1984 | Oizumi et al. | 219/69.16 |
| 4,628,173 A | * | 12/1986 | Ito | 219/69.16 |
| 4,806,719 A | * | 2/1989 | Seerieder et al. | 219/69.17 |
| 5,453,593 A | * | 9/1995 | Seok-Yong et al. | 219/69.17 |
| 6,580,049 B1 | * | 6/2003 | Katougi et al. | 219/69.2 |

FOREIGN PATENT DOCUMENTS

| | | | | |
|---|---|---|---|---|
| JP | 58-66626 | | 4/1983 | |
| JP | 59-69227 | | 4/1984 | |
| JP | Hei 2-212026 | | 8/1990 | |
| JP | 2-212026 A | * | 8/1990 | |
| JP | 3-35936 | | 2/1991 | |
| JP | Hei 3-149137 | | 6/1991 | |
| JP | 4-6-126540 A | * | 5/1994 | 219/69.17 |
| JP | Hei 10-166224 | | 6/1998 | |
| JP | 10-296540 | | 11/1998 | |

* cited by examiner

Primary Examiner—Geoffrey S. Evans
(74) Attorney, Agent, or Firm—Sughrue Mion, PLLC

(57) ABSTRACT

In an electric discharge machining apparatus for performing machining while relatively rocking an electrode (18) and a workpiece (W) in a plane vertical to a machining feed direction, there is provided an electric discharge state detection device (20) for detecting an electric discharge state by detecting a short-circuit frequency between the electrode and the workpiece, a defective electric discharge frequency and a position of the electrode, and a rocking function setting device (23) for setting parameters about a rocking function according to the electric discharge state detected by the electric discharge state detection device (20). A parameter setting about a rocking function according to the detected electric discharge state is automatically made without compelling an operator to make the parameter setting about the rocking function, and improvement in machining efficiency and stabilization of the machining can be achieved.

10 Claims, 6 Drawing Sheets

FIG. 2

| CONTROL OPERATION OF ROCKING FUNCTION | | DETECTED ELECTRIC DISCHARGE STATE | | |
|---|---|---|---|---|
| | | STABLE CONTINUATION | STABLE MACHINING | ABNORMAL ELECTRIC DISCHARGE CONTINUATION |
| | ROCKING SPEED | DECREASE | NORMAL (NO CONTROL) | INCREASE |
| | ROCKING RADIUS | SMALL | NORMAL | LARGE |
| EFFECT | | IMPROVE MACHINING EFFICIENCY BY CONTINUATION OF STABLE STATE | NORMAL | SUPPRESS CONTINUATION OF ABNORMAL ELECTRIC DISCHARGE AND IMPROVE ELIMINATION EFFICIENCY OF WORK SCRAPS |

FIG. 5

| | | WORKPIECE | | | |
|---|---|---|---|---|---|
| | | STEEL | ZINC ALLOY | CEMENTED CARBIDE | SPECIAL MATERIAL |
| ELECTRODE | COPPER | NORMAL | DECREASE | INCREASE | SETTABLE |
| | GRAPHITE | INCREASE | NORMAL | – | SETTABLE |
| | SPECIAL MATERIAL | SETTABLE | SETTABLE | SETTABLE | SETTABLE |

FIG. 6

| | DURING BITE CONTROL | DURING FORCED MACHINING CONTROL |
|---|---|---|
| ROCKING SPEED | INCREASE | INCREASE |
| ROCKING RADIUS | SETTING x 1/2 OR ZERO | SETTING x 1/2 |
| PURPOSE | IMPROVE MACHINING EFFICIENCY | AVOID UNSTABLE MACHINING |

ELECTRIC DISCHARGE MACHINING METHOD AND APPARATUS WITH CONTROL OF ROCKING FUNCTION PARAMETERS

This application is a continuation of PCT/JP99/07135, filed Dec. 20, 1999.

TECHNICAL FIELD

This invention relates to improvements in an electric discharge machining method and apparatus for performing machining (rocking machining) while rocking an electrode with respect to a workpiece in a plane vertical to a machining feed direction.

BACKGROUND ART

Electric discharge machining is machining for generating an electric discharge between an electrode and a workpiece (hereinafter called "between them") to melt and remove the workpiece. Thus, unless work scraps occurring between them due to the melt and removal of the workpiece are eliminated by some means, repeats of insulation recovery and electric discharge between them cannot be kept in a normal state, and bad effects such as a decrease in machining efficiency and a deterioration of work surface properties occur.

As one of elimination means of such work scraps between them, a rocking function of increasing efficiency of the elimination of the work scraps through stirring by performing machining while rocking the electrode relatively to the workpiece in a plane vertical to a machining feed direction has been known. Parameters about this rocking function include a locus of relative movement between an electrode and a workpiece (hereinafter called "rocking shape"), the amount of relative movement (hereinafter called "rocking radius"), a relative movement speed (hereinafter called "rocking speed"), and the number of divisions of the rocking shape and a division shape in the case of using means for dividing the rocking shape on making a determination of completion.

FIG. 7 is a diagram showing a configuration of a conventional electric discharge machining apparatus disclosed in JP-A-126540/1994 and in the drawing, numeral 1 is an electrode, and numeral 2 is a workpiece, and numeral 3 is a voltage detection part between the electrode and the workpiece, and numeral 4 is a calculation part, and numeral 5 is memory, and numeral 6 is a position check part, and numeral 7 is a rocking speed calculation part, and numeral 8 is a rocking speed table in which correspondence between an average voltage between the electrode 1 and the workpiece 2 and a rocking speed suitable for the voltage is previously registered. Also, FIG. 8 shows a situation in which an orbit path of a square rocking shape is divided into 12 portions, and in the drawing, numeral 9 is a rocking shape, and numeral 10 is one area divided. In FIG. 7, a machining voltage is applied between them from a voltage source (not shown), and the voltage between them is detected by the voltage detection part 3 between them. The calculation part 4 obtains a weighted average of a voltage between them detected by the voltage detection part 3 and previous calculation data (gap data) of the area. All the gap data about all the divided areas of the orbit path of the rocking shape are stored in the memory 5. The position check part 6 receives information from a motor control part (not shown) at the time of orbiting the next rocking shape, and checks the present position of the electrode, and checks whether it is positioned in any the divided area 10 of the rocking shape 9 of the electrode of FIG. 8, and gap data corresponding to an address of the checked position area is read from the memory 5, and supplies the gap data to the rocking speed setting part 7. The rocking speed setting part 7 reads out gap data before one orbit of the area stored in the memory 5, and sees the rocking speed table 8, and sets a rocking speed corresponding to the gap data read from the memory 5, and outputs the rocking speed to the motor control part as rocking speed data.

In the invention disclosed in JP-A-126540/1994 thus, the optimum rocking speed is set every machining area and electric discharge machining with stability and high accuracy is performed. However, a change in the rocking speed or a determination of completion is made by the average voltage between the electrode and the workpiece and in a method of detecting the average voltage between them to control rocking movement, it was difficult to detect an exact state of electric discharge every electric discharge pulse, and it was difficult to force machining conditions such as pause time at the time of stable electric discharge (for example, it means that pause time is reduced to force a value of the pause time in order to improve machining efficiency, and hereinafter called "forced machining at the time of stable machining") or take avoidance at the time of abnormal electric discharge. Further, control of a rocking function is performed by a machining shape or the amount of machining, but bite control (also known as chamfer control) at the beginning of machining and forced machining control after the machining is once completed are not performed.

Also, when an operator inputs a machining state and sets parameters about a rocking function, there were problems that skill of the operator is required while the operator needs to monitor the machining state from beginning to end of the machining.

DISCLOSURE OF THE INVENTION

This invention is implemented to solve the problems as described above, and an object of the invention is to obtain an electric discharge machining method and apparatus capable of automatically making a parameter setting about a rocking function according to a detected electric discharge state without compelling an operator to make the parameter setting about the rocking function and achieving improvement in machining efficiency and stabilization of the machining.

With an electric discharge machining method in accordance with the invention, in an electric discharge machining method for performing machining while relatively rocking an electrode and a workpiece in a plane vertical to a machining feed direction, an electric discharge state is detected by detecting a short-circuit frequency between the electrode and the workpiece, a defective electric discharge frequency and a position of the electrode, and parameters about a rocking function are set according to the electric discharge state.

Also, an initial setting of a rocking speed is changed according to a combination of the electrode and the workpiece, a shape of the electrode or a rocking shape.

Also, in an electric discharge machining method for performing machining while relatively rocking an electrode and a workpiece in a plane vertical to a machining feed direction, an electric discharge state is detected by detecting a short-circuit frequency between the electrode and the workpiece, a defective electric discharge frequency and a position of the electrode, and a rocking speed is set to a speed higher than that of a stable machining state when the detected electric discharge state is an abnormal electric discharge continuation state and a rocking speed is set to a speed lower than that of a stable machining state when the detected electric discharge state is a stable continuation state.

Also, in an electric discharge machining method for performing machining while relatively rocking an electrode and a workpiece in a plane vertical to a machining feed direction, when bite control or forced machining control is set, a rocking speed is set to a speed higher than a value before the setting of the bite control or the forced machining control.

Also, a rocking radius is set to a value smaller than a value before the setting of the bite control or the forced machining control.

With an electric discharge machining apparatus in accordance with the invention, in an electric discharge machining apparatus for performing machining while relatively rocking an electrode and a workpiece in a plane vertical to a machining feed direction, there are provided electric discharge state detection means for detecting a short-circuit frequency between the electrode and the workpiece, a defective electric discharge frequency and a position of the electrode, and rocking function setting means for setting parameters about a rocking function according to the electric discharge state detected by the electric discharge state detection means.

Also, there is provided rocking function setting means for changing an initial setting of a rocking speed according to a combination of the electrode and the workpiece, a shape of the electrode or a rocking shape.

Also, in an electric discharge machining apparatus for performing machining while relatively rocking an electrode and a workpiece in a plane vertical to a machining feed direction, there are provided electric discharge state detection means for detecting a short-circuit frequency between the electrode and the workpiece, a defective electric discharge frequency and a position of the electrode, and rocking function setting means for setting a rocking speed to a speed higher than that of a stable machining state when the electric discharge state detected by the electric discharge state detection means is an abnormal electric discharge continuation state and setting a rocking speed to a speed lower than that of a stable machining state when the electric discharge state detected by the electric discharge state detection means is a stable continuation state.

Also, in an electric discharge machining apparatus for performing machining while relatively rocking an electrode and a workpiece in a plane vertical to a machining feed direction, there is provided rocking function setting means for setting a rocking speed to a speed higher than a value before the setting of bite control or forced machining control when the bite control or the forced machining control is set.

Also, there is provided rocking function setting means for setting a rocking radius to a value smaller than a value before the setting of the bite control or the forced machining control.

Since the invention is constructed as described above, an exact electric discharge state every electric discharge pulse can be detected, and forced machining at the time of stable machining by the rocking movement or avoidance at the time of abnormal electric discharge can be performed. Therefore, there is an effect capable of achieving improvement in machining efficiency and stabilization of the machining.

Also, there is an effect capable of achieving improvement in machining efficiency and stabilization of the machining more by changing an initial setting of a rocking speed according to a combination of an electrode and a workpiece, an electrode shape or a rocking shape.

Further, there is an effect capable of performing bite control and forced machining control.

Furthermore, there is an effect capable of automatically making a parameter setting about a rocking function according to a detected electric discharge state without compelling an operator to make the parameter setting about the rocking function.

BRIEF DESCRIPTION OF THE DRAWINGS

FIG. 2 is an illustration showing an example of a control operation of rocking functions performed according to a detected electric discharge state in accordance with the first embodiment of the invention;

FIG. 5 is an illustration showing an example of the case of changing initialization of a rocking speed by combinations of an electrode and a workpiece in accordance with a second embodiment of the invention;

FIG. 6 is an illustration showing a setting example of a rocking speed and a rocking radius of the case of setting bite control or machining control in accordance with a third embodiment of the invention;

BEST MODE FOR CARRYING OUT THE INVENTION

First Embodiment

Figure 1:
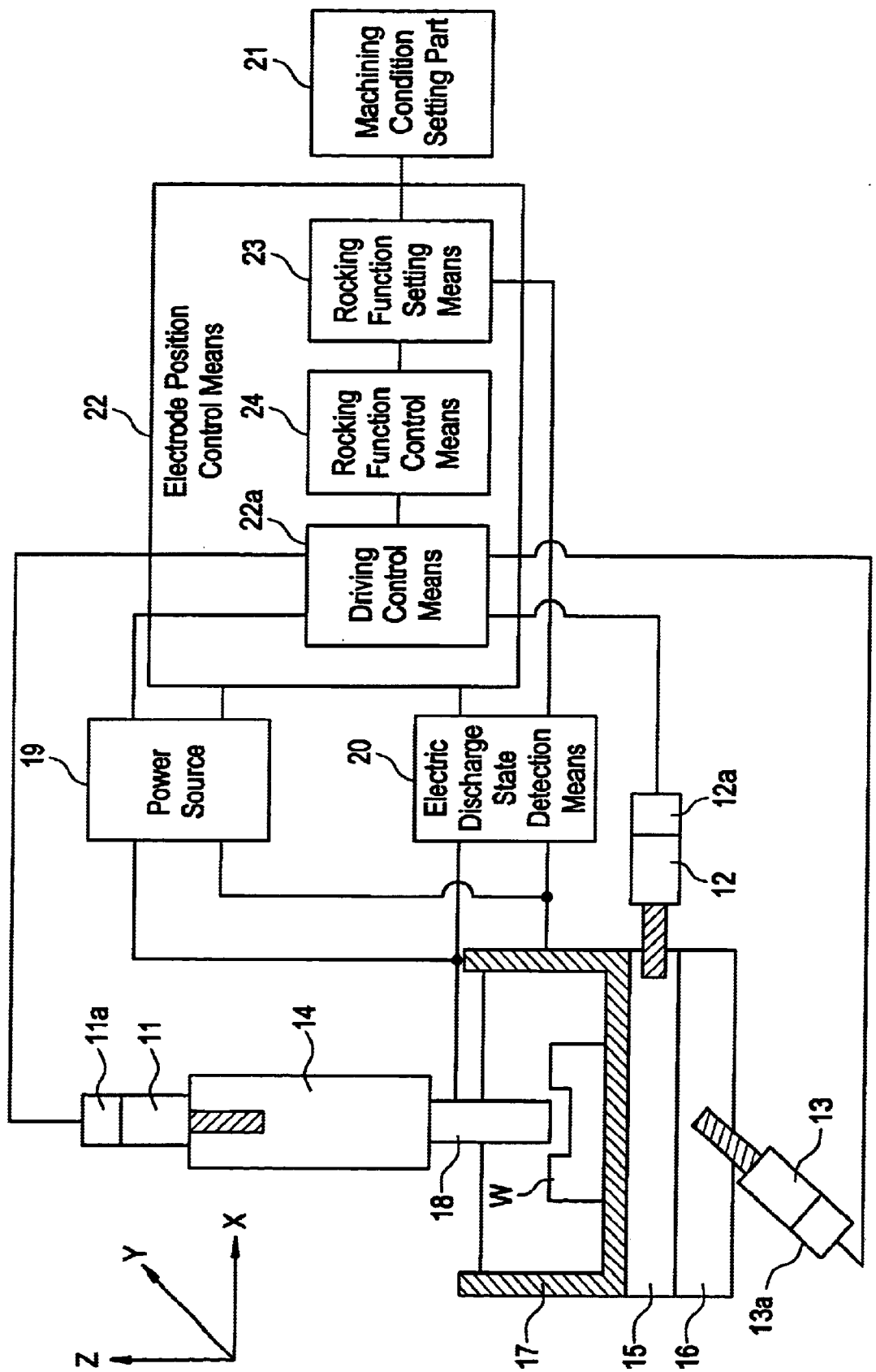
FIG. 1 is a configuration diagram of an electric discharge machining apparatus in accordance with a first embodiment of this invention.

FIG. 1 is a configuration diagram of an electric discharge machining apparatus in accordance with a first embodiment of this invention, and in the drawing, numerals 11, 12 and 13 are motors, and numerals 11a, 12a and 13a are position detection means of the motors 11, 12 and 13, respectively, and numeral 14 is a main shaft driven in the Z axis direction by the motor 11, and numeral 15 is a worktable driven in the X axis direction by the motor 12, and numeral 16 is a worktable driven in the Y axis direction by the motor 13, and numeral 17 is a machining bath placed on the worktable 15, and numeral 18 is an electrode mounted in the main shaft 14, and numeral 19 is a power source unit for supplying machining power between the electrode 18 and a workpiece W, and numeral 20 is electric discharge state detection means connected between the electrode 18 and the workpiece W, and numeral 21 is a machining condition setting part for setting a machining condition by a machining program etc., and numeral 22 is electrode position control means which comprises motor 11,12 and driving control means 22a of motor 13, rocking function setting means 23 for administering a parameter setting about a rocking function and rocking function control means 24 for controlling the rocking function by parameters about the rocking function set in the rocking function setting means 23. A relative position between the electrode 18 and the workpiece W can be calculated and obtained by a calculation function of the driving control means 22a based on positions of the motors 11, 12 and 13 detected by the position detection means 11a, 12a and 13a. Also, the workpiece W is fixed in the machining bath 17 while machining liquid is injected in the machining bath 17.

The electric discharge state detection means 20 has a function of detecting and recording a normal electric discharge frequency, a short-circuit frequency between the electrode and the workpiece, a defective electric discharge frequency per unit time and an electrode position, and transfers an electric discharge state at that time or the previous electric discharge state of the same place to the rocking function setting means 23.

Also, the machining condition setting part 21 sets conditions about machining contents such as jet and suction of machining liquid, bite control at the time of starting the machining, materials of an electrode and a workpiece in addition to electric discharge machining conditions such as a pulse width and pause time.

Also, the rocking function setting means 23 sets parameters about rocking functions such as a rocking shape, a rocking radius and a rocking speed.

Also, the rocking function control means 24 performs a relative movement between the electrode 18 and the workpiece W constructed of the electric discharge machining conditions and the machining contents set by the machining condition setting part 21 and function setting means 23 by driving and controlling the motors 12 and 13.

Figure 3:
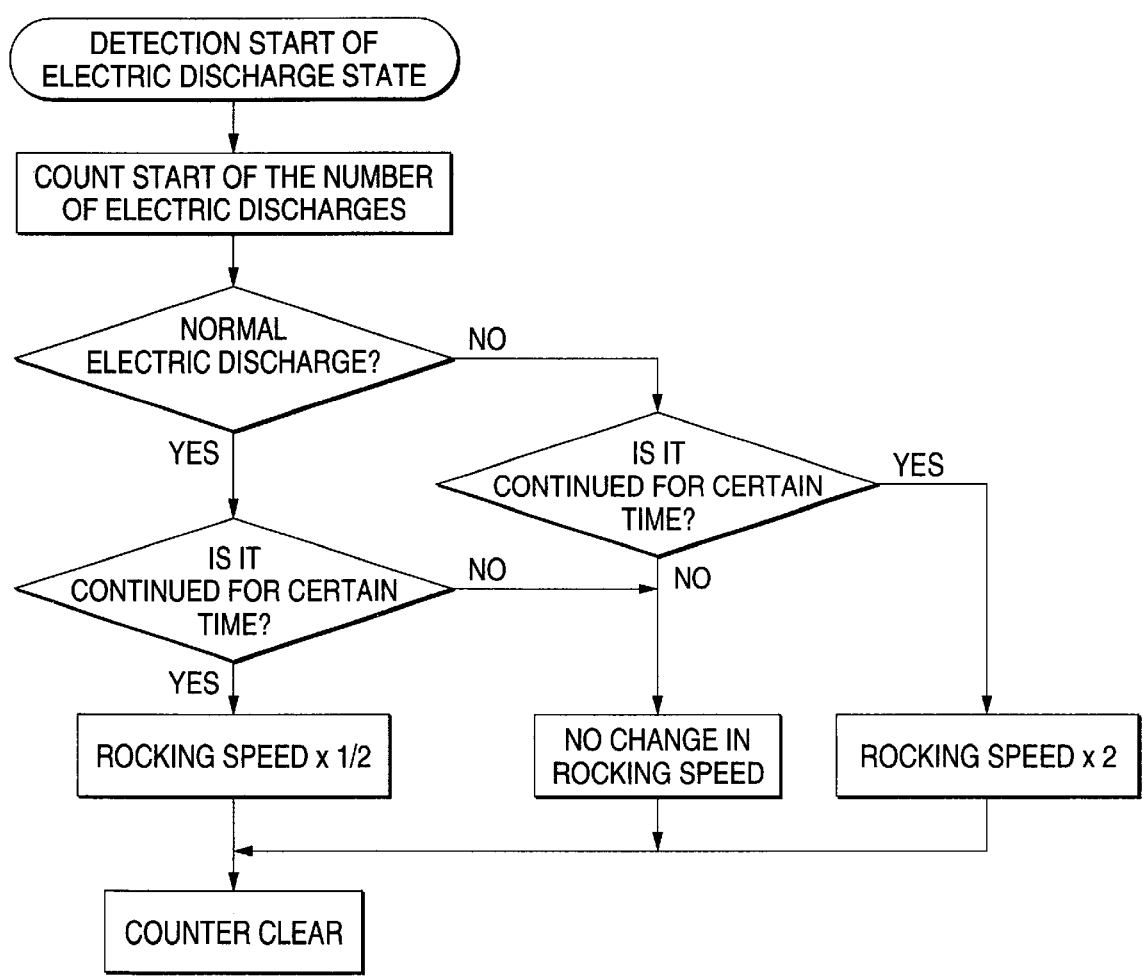
FIG. 3 is an illustration showing an example of a flowchart of the case of controlling a rocking speed by the electric discharge state in accordance with the first embodiment of the invention.

FIG. 2 shows an example of a control operation of the rocking functions performed according to a detected electric discharge state. Also, FIG. 3 shows an example of a flowchart of the case of controlling a rocking speed by the electric discharge state as shown in FIG. 2. By the electric discharge state detection means 20 of FIG. 1, it is controlled so that the rocking speed becomes higher than that of a stable machining state when it is detected that the present electric discharge state or the previous electric discharge state of the same place is unstable (abnormal electric discharge continuation) and the rocking speed becomes lower than that of a stable machining state when a stable state is continued for a certain time. Detection of the electric discharge state by the electric discharge state detection means 20 can be performed, for example, as the following descriptions (a) to (c).

(a) Detection of Stable Continuation State

The case that the total frequency of a short-circuit frequency between the electrode and the workpiece and a defective electric discharge frequency within a certain time is zero or less than a predetermined percentage (for example, 10%) is detected as a stable continuation state.

(b) Detection of Stable Machining State

The case that the total frequency of a short-circuit frequency between the electrode and the workpiece and a defective electric discharge frequency within a certain time is within the range of a predetermined percentage (for example, from 10% to 30%) and a short circuit between them or a defective electric discharge does not occur in the same electrode position is detected as a stable machining state.

(c) Detection of Abnormal Electric Discharge Continuation State

The case that the total frequency of a short-circuit frequency between the electrode and the workpiece and a defective electric discharge frequency within a certain time is a predetermined percentage (for example, 40%) or more is detected as an abnormal electric discharge continuation state.

According to such a detection method of the electric discharge state, an exact electric discharge state every electric discharge pulse can be detected in comparison with a method for calculating an average voltage between them to control rocking movement. Therefore, forced machining at the time of stable machining by the rocking movement or avoidance at the time of abnormal electric discharge can be performed.

Figure 4:
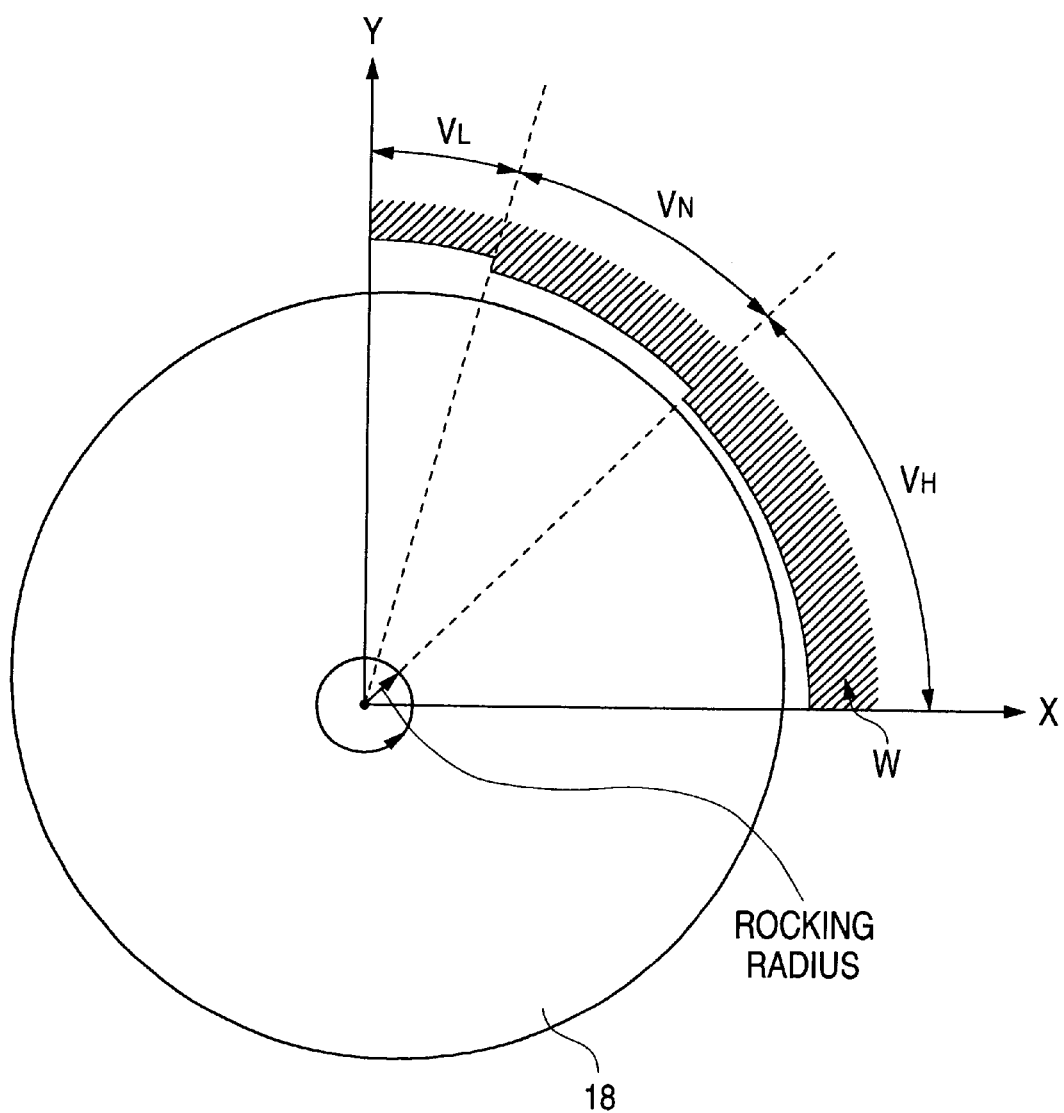
FIG. 4 is an illustration showing a change in the electric discharge state by a rocking speed in accordance with the first embodiment of the invention.
Figure 7:
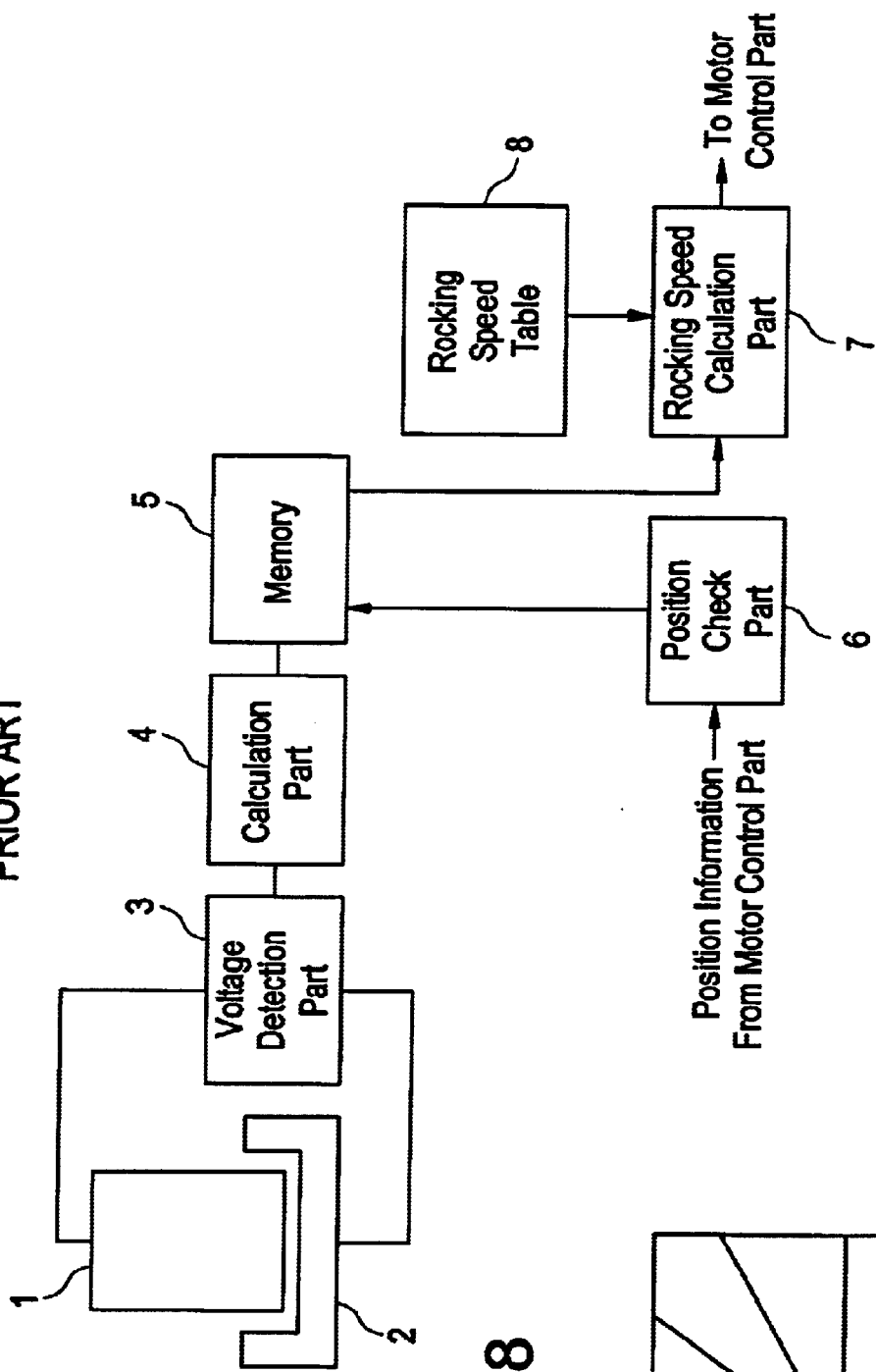
FIG. 7 is a configuration diagram of a conventional electric discharge machining apparatus.
Figure 8:
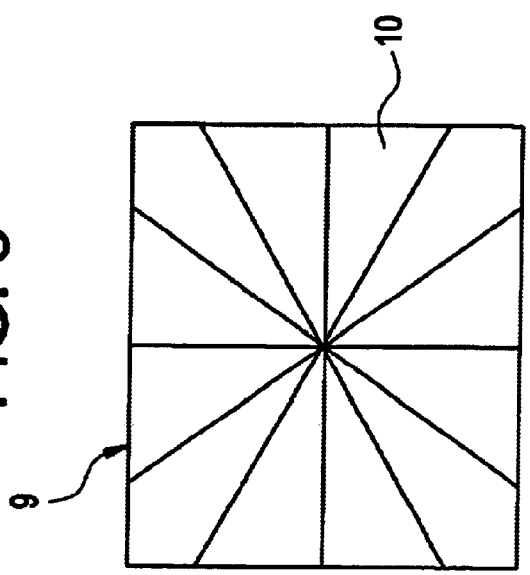
FIG. 8 is an illustration showing a division example of an orbit path of a square rocking shape.

FIG. 4 shows a change in the electric discharge state by a rocking speed and in the drawing, numeral 18 is an electrode and W is a workpiece and $V_H$ shows the case of a high rocking speed and $V_N$ shows the case of a normal rocking speed and $V_L$ shows the case of a low rocking speed. In the case of a high rocking speed ($V_H$), since a movement speed of the electrode 18 is high, the amount of machining of the same place becomes small even if the amount of machining per unit time is constant, but since abnormal electric discharge is difficult to continue in the same electrode position, it is prone to recover to a stable electric discharge state. Also, since the amount of electrode movement per unit time is large, work scraps do not remain in one place and elimination efficiency of the work scraps improves. In the case of a low rocking speed ($V_L$), since abnormal electric discharge is prone to continue in the same place, it cannot be applied at the time of unstable machining, but the amount of machining of the same place becomes large since the amount of electrode movement per unit time is small. Therefore, machining efficiency improves when a stable electric discharge state continues.

In the description, the case of changing the rocking speed is shown as an example of a control operation of parameters about a rocking function performed according to a detected electric discharge state, but parameters about another rocking function such as a rocking radius may be changed.

Second Embodiment

As shown in the first embodiment, since an electric discharge state changes by a rocking speed, even in case that abnormal electric discharge resulted from combinations of materials of an electrode and a workpiece occurs, improvement in machining efficiency and stabilization of the machining can be achieved more by presetting the rocking speed by rocking function setting means and changing an initial setting of the rocking speed.

FIG. 5 shows an example of the case of changing an initial setting of a rocking speed by combinations of an electrode and a workpiece in accordance with a second embodiment of the invention. Since a combination in which the electrode is graphite and the workpiece is cemented carbide is generally used, the combination is a blank. In an example of FIG. 5, the case that copper is used as the electrode and steel is used as the workpiece and the case that graphite is used as the electrode and zinc alloy is used as the workpiece are set as normal. In the case that graphite is used as the electrode and steel is used as the workpiece, since abnormal electric discharge is prone to occur, in order to avoid this, a setting in which a rocking speed is previously increased to improve elimination efficiency of work scraps is made. Also, in the case that copper is used as the electrode and zinc alloy is used as the workpiece, since electric discharge machinability is good, a setting in which a rocking speed is previously decreased to improve machining efficiency is made. Further, in the case that copper is used as the electrode and cemented carbide is used as the workpiece, since machining is prone to become unstable, in order to avoid this, a rocking speed is previously increased. Also, in the case of using special materials other than the materials described above, an operator can input separately.

Such a setting of changing an initial setting of a rocking speed may specifically be made, for example, by setting the initial setting to "an initial setting value of a rocking speed×½" in the case of "decreasing" and setting the initial setting to "an initial setting value of a rocking speed×2" in the case of "increasing". Or, a predetermined value determined by experiment etc. may be set.

Also, in machining in which abnormal electric discharge becomes large in the case of a complicated electrode shape or rocking shape other than the setting by the combinations of materials, a change in an initial setting of the rocking speed can be preset by rocking function setting means 23.

In this manner, improvement in machining efficiency and stabilization of the machining can be achieved further by changing an initial setting of the rocking speed according to the combinations of the electrode and the workpiece, the electrode shape or the rocking shape.

In the description, the case of changing the rocking speed is shown as an example of a control operation of parameters about a rocking function performed according to a detected electric discharge state, but parameters about another rocking function such as a rocking radius may be changed.

Third Embodiment

A function of changing a rocking speed and a rocking radius in the case of setting bite control or forced machining control can be added to rocking function setting means. In bite control at the beginning of machining and forced machining control after the machining is once completed, since space between an electrode and a workpiece is clean, work scraps contributing to the machining decrease extremely and thereby, a short circuit or a local concentrated electric discharge is prone to occur. Therefore, when the machining at the set rocking radius and rocking speed is performed, it takes a considerable time until the machining becomes stable. Also, this tendency is particularly strong in finish machining with small electric discharge energy. Because of this, in the bite control and the forced machining control, there is a high need to properly set parameters about a rocking function.

FIG. 6 is an illustration showing a setting example of a rocking speed and a rocking radius of the case of setting bite control or forced machining control in accordance with a third embodiment of the invention, and in the case of setting the bite control or the forced machining control, a rocking radius is set to a value smaller than a setting rocking radius while increasing a rocking speed.

In case of setting the bite control or the forced machining control, by increasing the rocking speed, continuation of abnormal electric discharge in the same place can be suppressed to improve machining stability. Also, machining stability and machining accuracy can be improved by setting a rocking radius to a value smaller than a setting rocking radius (for example, ½ of a setting rocking radius) and reducing an influence by the side of an electrode and mainly performing machining by the bottom of the electrode.

An area of the side of the electrode may become larger than an area of the bottom of the electrode depending on a machining depth. In such a case, machining stability and machining accuracy can be improved further by increasing the rocking speed and decreasing the rocking radius.

Industrial Applicability

As described above, the electric discharge machining method and apparatus according to this invention are suitable for use in rocking machining.

What is claimed is:

1. An electric discharge machining method for performing machining while relatively rocking an electrode and a workpiece in a plane vertical to a machining feed direction, characterized in that an electric discharge state is detected by detecting a short-circuit frequency between the electrode and the workpiece, a defective electric discharge frequency and a position of the electrode, and parameters about a rocking function are set according to the electric discharge state.

2. An electric discharge machining method as defined in claim 1, characterized in that an initial setting of a rocking speed is changed according to a combination of the electrode and the workpiece, a shape of the electrode or a rocking shape.

3. An electric discharge machining method for performing machining while relatively rocking an electrode and a workpiece in a plane vertical to a machining feed direction, characterized in that an electric discharge state is detected by detecting a short-circuit frequency between the electrode and the workpiece, a defective electric discharge frequency and a position of the electrode, and a rocking speed is set to a speed higher than that of a stable machining state when the detected electric discharge state is an abnormal electric discharge continuation state and a rocking speed is set to a speed lower than that of a stable machining state when the detected electric discharge state is a stable continuation state.

4. An electric discharge machining method for performing machining while relatively rocking an electrode and a workpiece in a plane vertical to a machining feed direction, characterized in that when bite control or forced machining control is set, a rocking speed is set to a speed higher than a value before the setting of the bite control or the forced machining control.

5. An electric discharge machining method as defined in claim 4, characterized in that a rocking radius is set to a value smaller than a value before the setting of the bite control or the forced machining control.

6. An electric discharge machining apparatus for performing machining while relatively rocking an electrode and a workpiece in a plane vertical to a machining feed direction, characterized by comprising electric discharge state detection means for detecting a short-circuit frequency between the electrode and the workpiece, a defective electric discharge frequency and a position of the electrode, and rocking function setting means for setting parameters about a rocking function according to the electric discharge state detected by the electric discharge state detection means.

7. An electric discharge machining apparatus as defined in claim 6, characterized by comprising rocking function setting means for changing an initial setting of a rocking speed according to a combination of the electrode and the workpiece, a shape of the electrode or a rocking shape.

8. An electric discharge machining apparatus for performing machining while relatively rocking an electrode and a workpiece in a plane vertical to a machining feed direction, characterized by comprising electric discharge state detection means for detecting a short-circuit frequency between the electrode and the workpiece, a defective electric discharge frequency and a position of the electrode, and rocking function setting means for setting a rocking speed to a speed higher than that of a stable machining state when the electric discharge state detected by the electric discharge state detection means is an abnormal electric discharge continuation state and setting a rocking speed to a speed lower than that of a stable machining state when the electric discharge state detected by the electric discharge state detection means is a stable continuation state.

9. An electric discharge machining apparatus for performing machining while relatively rocking an electrode and a workpiece in a plane vertical to a machining feed direction, characterized by comprising rocking function setting means for setting a rocking speed to a speed higher than a value before the setting of bite control or forced machining control when the bite control or the forced machining control is set.

10. An electric discharge machining apparatus as defined in claim 9, characterized by comprising rocking function setting means for setting a rocking radius to a value smaller than a value before the setting of the bite control or the forced machining control.

* * * * *